United States Patent
Owens et al.

(10) Patent No.: US 12,505,650 B1
(45) Date of Patent: Dec. 23, 2025

(54) METHOD, PROGRAM, AND APPARATUS FOR AUTOMATED ANALYSIS OF CRIMINAL EVIDENCE

(71) Applicant: Semantics 21 LTD., Stafford (GB)

(72) Inventors: Liam Owens, Stafford (GB); Claude Chibelushi, Stafford (GB)

(73) Assignee: Semantics 21 LTD., Stafford (GB)

(*) Notice: Subject to any disclaimer, the term of this patent is extended or adjusted under 35 U.S.C. 154(b) by 0 days.

(21) Appl. No.: 19/252,171

(22) Filed: Jun. 27, 2025

Related U.S. Application Data

(63) Continuation of application No. 19/035,314, filed on Jan. 23, 2025, now abandoned.

(30) Foreign Application Priority Data

Nov. 26, 2024 (GB) ...................... 2417329

(51) Int. Cl.
*G06V 10/70* (2022.01)
*G06V 10/26* (2022.01)
(Continued)

(52) U.S. Cl.
CPC ............ *G06V 10/768* (2022.01); *G06V 10/26* (2022.01); *G06V 10/74* (2022.01); *G06V 10/86* (2022.01)

(58) Field of Classification Search
CPC ...... G06V 10/768; G06V 10/26; G06V 10/74; G06V 10/86
See application file for complete search history.

(56) References Cited

U.S. PATENT DOCUMENTS

2018/0276207 A1\* 9/2018 Beller .................... G06F 16/48
2020/0302177 A1\* 9/2020 Nguyen ................. G06F 18/24
(Continued)

OTHER PUBLICATIONS

Becker et al, "Hypothesis-driven Case Analysis in 3D-Space as a Support for Forensic Casework", p. 11-21, 2021 (Year: 2021).\*
(Continued)

*Primary Examiner* — Ming Y Hon
(74) *Attorney, Agent, or Firm* — John P. Teresinski; Stites & Harbison, PLLC

(57) ABSTRACT

Aspects include a computer-implemented method for processing digital data relating to a criminal investigation, the method comprising: obtaining multiple sources of digital input data including one or more from among: digital photographic images; and digital video. The method further comprising executing an image processing procedure on the digital input data including: segmenting the digital input data to obtain a set of segmented entity appearances; encoding the population of segmented entity appearances by mapping the population of segmented entity appearances to a set of defined semantic concepts; extracting from the digital input data a set of appearance relationships between segmented entity appearances; augmenting the set of defined semantic concepts by encoding, in accordance with the mapping, the set of appearance relationships as semantic relationships between the defined semantic concepts; based on an hypothesis received from an end user and relating to the defined semantic concepts and including at least one of natural language and an image of an entity; comparing the hypothesis with the augmented set of defined semantic concepts to identify, in accordance with the mapping, digital input data featuring at least one of segmented entity appearances and appearance relationships mapping to semantic concepts supporting or otherwise consistent with the hypoth- (Continued)

esis; outputting the identified digital input data to the end user in response to the received hypothesis.

21 Claims, 11 Drawing Sheets

(51) Int. Cl.
  *G06V 10/74* (2022.01)
  *G06V 10/86* (2022.01)

(56) References Cited

U.S. PATENT DOCUMENTS

| | | | |
|---|---|---|---|
| 2022/0121884 A1* | 4/2022 | Zadeh | G06N 3/006 |
| 2022/0215175 A1* | 7/2022 | Li | G06N 3/045 |
| 2023/0044420 A1* | 2/2023 | Abouelela | G06V 10/751 |
| 2024/0362062 A1* | 10/2024 | Chalmers | G06F 9/4881 |

OTHER PUBLICATIONS

Costantini et al, "Digital forensics and investigations meet artificial intelligence" Annals of Mathematics and Artificial Intelligence (2019) 86:193-229 (Year: 2019).*
Magnet Forensics—AXIOM, Griffeye, Automate(magnetforensics.com), Oct. 2025.
MSAB—XRY/XAMN(msab.com), Oct. 2025.
Detego Unified Forensics Platform(detegoforensics.com), Oct. 2025.
Oxygen Forensics—Detective (oxygen-forensic.com), Oct. 2025.
Amped Software—FIVE(ampedsoftware.com/five), Oct. 2025.
Cellebrite—Pathfinder(cellebrite.com/en/pathfinder), Oct. 2025.
BlackRainbow—Nexus(blackrainbow.com), Oct. 2025.
Belkasoft—X (belkasoft.com/x), Oct. 2025.

* cited by examiner

METHOD, PROGRAM, AND APPARATUS FOR AUTOMATED ANALYSIS OF CRIMINAL EVIDENCE

FIELD

The invention lies in the field of automated analysis of criminal evidence, and in particular relates to leveraging one or more machine learning models to interrogate digital evidence and to test factual hypotheses applied to the digital evidence by an investigator.

BACKGROUND

Crimes such as kidnapping, human trafficking, and child sexual abuse, ruin the lives of victims. Increasing prevalence of digital imaging devices, audio recording devices, and technologies such as cloud storage, result in a large amount of digital data available to investigators seeking to identify victims, potential victims, or perpetrators of such crimes. The quantity of data is such that investigators require automated tools to provide leads such as identification of victims, perpetrators, or other entities such as vehicles or locations relevant to such crimes.

The volume and complexity of digital crimes are rising. For example, child sexual exploitation and abuse online is escalating, worldwide. A report, published in 2023 by WeProtect Global Alliance, revealed an 87% increase in child sexual abuse material reported to NCMEC (National Center for Missing & Exploited Children), since 2019, with over 32 million of these reports raised globally. This increase is nearly equivalent to a doubling of the number of reports, over that period.

As illustrated above for child sexual exploitation and abuse, the rate of crimes which have an associated digital footprint, is rising. So, it is not surprising that, worldwide, there is a growing backlog of crime cases awaiting examination by digital forensics or other investigators. The backlog has been caused by the high rate of digital crimes and the growing volume and complexity of data associated with each crime. To give an indication of the amount of data dealt with by digital forensics investigators, it should be noted that a single crime case can involve images and videos stored on one or more hard disks, and on other devices such as mobile phones. The increasing storage and processing capacity of each device is aggravating the situation. For instance, personal computers with a 1 TB disk, or more, are now commonplace. A 4 TB disk drive (for example) is estimated to be able to hold about 1 million photos, or more than 560 hours of HD video, or 760 thousand MP3 songs. Thus, increasingly large amounts of digital media files are routinely seized for investigation by the police. This growth in the amount of evidential material awaiting investigation puts a significant burden on digital forensics units, and related agencies, worldwide.

The quantity of data (in particular, data contained in video, image, audio, and text files) produced and consumed by individuals and organisations, is massive and it keeps increasing at a phenomenal rate. Many criminal investigations involve scrutinising such digital material, which may be encountered across a wide range of domains, including law enforcement, corporate and other sectors. When faced with the task of searching for evidential facts, investigators are overwhelmed by the quantity, as well as the complexity or variety of the content, of the material to trawl through; often the material comes from multiple sources. Due to lack of adequate human resources and to limitations or deficiencies of conventional investigation tools, investigators struggle to review the evidence, which is often difficult to tease out from the high volumes of data contained in such material; the difficulty may be compounded by intricate details that may be included in such material.

Metadata is increasingly relevant due to the use of multi-function devices such as mobile phones which comprise GPS sensor technology and imaging technology, and so metadata such as geographic location is associated with image data. Relevant evidential detail may be embodied in metadata readable by a machine but not visible to a human investigator.

SUMMARY

One or more aspects of the invention of the present application are set out in the claims.

A first aspect comprises a computer-implemented method for processing digital data relating to a criminal investigation, the method comprising: obtaining multiple sources of digital input data including one or more from among: digital photographic images; digital video; executing an image processing procedure on the digital input data including: segmenting the digital input data to obtain a set of segmented entity appearances; encoding the population of segmented entity appearances by mapping the population of segmented entity appearances to a set of defined semantic concepts; extracting from the digital input data a set of appearance relationships between segmented entity appearances; augmenting the set of defined semantic concepts by encoding, in accordance with the mapping, the set of appearance relationships as semantic relationships between the defined semantic concepts; based on an hypothesis received from an end user and relating to the defined semantic concepts and including at least one of natural language and an image of an entity; comparing the hypothesis with the augmented set of defined semantic concepts to identify, in accordance with the mapping, digital input data featuring at least one of segmented entity appearances and appearance relationships mapping to semantic concepts supporting or otherwise consistent with the hypothesis; outputting the identified digital input data to the end user in response to the received hypothesis.

Optionally, the method further comprises: assigning a digital input data score to each piece of identified digital input data representing a value of the piece of identified digital input data in supporting the hypothesis.

Optionally, the scores assigned to the pieces of identified digital input data are calculated based on one or more from among: a score calculated by a pre-trained machine learning algorithm; and a set of predefined processing rules.

Optionally, the set of predefined processing rules includes calculating a contribution to the score proportional to a count of a number of segmented entity appearances mapping to the same single semantic concept.

Optionally, the method further comprises: assigning a semantic concept score to each defined semantic concept representing a confidence level attaching to the semantic concept based on the appearances of the semantic concept in the digital input data.

Optionally, the method further comprises: assigning a semantic relationship score to each semantic relationship in the augmented set of defined semantic concepts, the semantic relationship score representing a confidence level attaching to the semantic relationship based on the appearance relationships of the digital input data mapping to the semantic relationship.

Optionally, the method further comprises, based on one or more from among: digital input data scores assigned to each piece of identified digital input data relevant to the hypothesis; the semantic concept scores assigned to semantic concepts in the hypothesis; the semantic relationship scores assigned to semantic relationships in the hypothesis; calculating a hypothesis score representing an extent to which the parsed hypothesis is supported by the digital input data.

Optionally, the hypothesis score is calculated by a machine learning model taking as inputs one or more from among: digital input data scores assigned to each piece of identified digital input data relevant to the hypothesis; the semantic concept scores assigned to semantic concepts in the hypothesis; the semantic relationship scores assigned to semantic relationships in the hypothesis.

Optionally, the machine learning model is pre-trained with training data comprising hypotheses, and for each hypothesis corresponding support data including at least one of: digital input data and assigned scores, semantic concepts and assigned scores, and semantic relationships and assigned scores, and as ground truths, hypothesis scores assigned to each of the hypotheses by human experts based on an extent to which the hypothesis is considered to be factually supported by the corresponding support data, the machine learning model being trained to minimise a difference between hypothesis scores generated by the model and the ground truths.

Optionally, the method further comprises: by a pre-trained machine learning algorithm, adaptively modifying the parsed hypothesis to optimise the hypothesis score.

Optionally, the method further comprises: based on the augmented set of defined semantic concepts and asserting a fact about one or more of the defined semantic concepts, representing the generated hypothesis in natural language, and outputting the natural language representation of the generated hypothesis.

Optionally, the generated hypothesis is that a person is a victim or potential victim of a crime. Optionally, the generated hypothesis is that a person is a perpetrator or a potential perpetrator of a crime. The person being a person appearing in the digital input data and being a semantic concept in the set of defined semantic concepts.

Optionally, the generated hypothesis further comprises a predicted geographical location of the victim or suspect or of the crime, based on information extracted from the augmented set of defined semantic concepts.

Optionally, the outputting the natural language representation of the generated hypothesis includes outputting, or outputting links to, the digital input data featuring segmented entity appearances mapped to the one or more defined semantic concepts featured in the generated hypothesis.

Optionally, the augmented set of defined semantic concepts is encoded in a data graph, in which data graph each of the set of defined semantic concepts is represented by a node, and each of the semantic relationships is represented by an edge between two nodes.

Optionally, the image processing procedure executed on the digital input data further comprises: receiving from the end user a hypothesis including a search query comprising an image of an entity or entities or a text string describing an entity or entities; and the segmenting the digital input data to obtain a set of segmented entity appearances is limited to entity appearances of entities matching the search query or satisfying the search query to within a predefined similarity threshold.

Optionally, the hypothesis received from the end user further comprises a statement relating to the entity or entities appearing in the search query, the comparing the hypothesis with the augmented set of defined semantic concepts being based on the statement.

Optionally, the comparing the hypothesis with the augmented set of defined semantic concepts includes identifying a first semantic concept, being a semantic concept not being represented in the hypothesis received from the end user and having at least one appearance relationship with a second semantic concept, being a semantic concept represented in the hypothesis received from the end user, and outputting to the end user a proposed hypothesis including a representation of the first semantic concept as a search query.

Optionally, the method further comprises, in response to a positive response from the end user, performing the image processing procedure with the proposed hypothesis replacing the hypothesis received from the end user.

Another aspect includes a data processing system comprising processor hardware and memory hardware, the data processing system being configured to perform a computer-implemented method comprising: obtaining multiple sources of digital input data including one or more from among: digital photographic images; digital video; executing an image processing procedure on the digital input data including: segmenting the digital input data to obtain a set of segmented entity appearances; encoding the population of segmented entity appearances by mapping the population of segmented entity appearances to a set of defined semantic concepts; extracting from the digital input data a set of appearance relationships between segmented entity appearances; augmenting the set of defined semantic concepts by encoding, in accordance with the mapping, the set of appearance relationships as semantic relationships between the defined semantic concepts; based on an hypothesis received from an end user and relating to the defined semantic concepts and including at least one of natural language and an image of an entity; comparing the hypothesis with the augmented set of defined semantic concepts to identify, in accordance with the mapping, digital input data featuring at least one of segmented entity appearances and appearance relationships mapping to semantic concepts supporting or otherwise consistent with the hypothesis; outputting the identified digital input data to the end user in response to the received hypothesis.

Another aspect includes a computer program comprising processing instructions which, when executed by a data processing system comprising memory hardware and processor hardware, cause the data processing system to perform a method comprising: obtaining multiple sources of digital input data including one or more from among: digital photographic images; digital video; executing an image processing procedure on the digital input data including: segmenting the digital input data to obtain a set of segmented entity appearances; encoding the population of segmented entity appearances by mapping the population of segmented entity appearances to a set of defined semantic concepts; extracting from the digital input data a set of appearance relationships between segmented entity appearances; augmenting the set of defined semantic concepts by encoding, in accordance with the mapping, the set of appearance relationships as semantic relationships between the defined semantic concepts; based on an hypothesis received from an end user and relating to the defined semantic concepts and including at least one of natural language and an image of an entity; comparing the hypothesis with the augmented set of defined semantic concepts to identify, in accordance with the mapping, digital input data featuring at least one of segmented entity appearances and appearance relationships mapping to semantic concepts supporting or otherwise consistent with the hypothesis; outputting the identified digital input data to the end user in response to the received hypothesis.

BRIEF DESCRIPTION OF THE DRAWINGS

Embodiments will now be described in more detail with reference to the accompanying drawings, in which.

DETAILED DESCRIPTION

Figure 1:
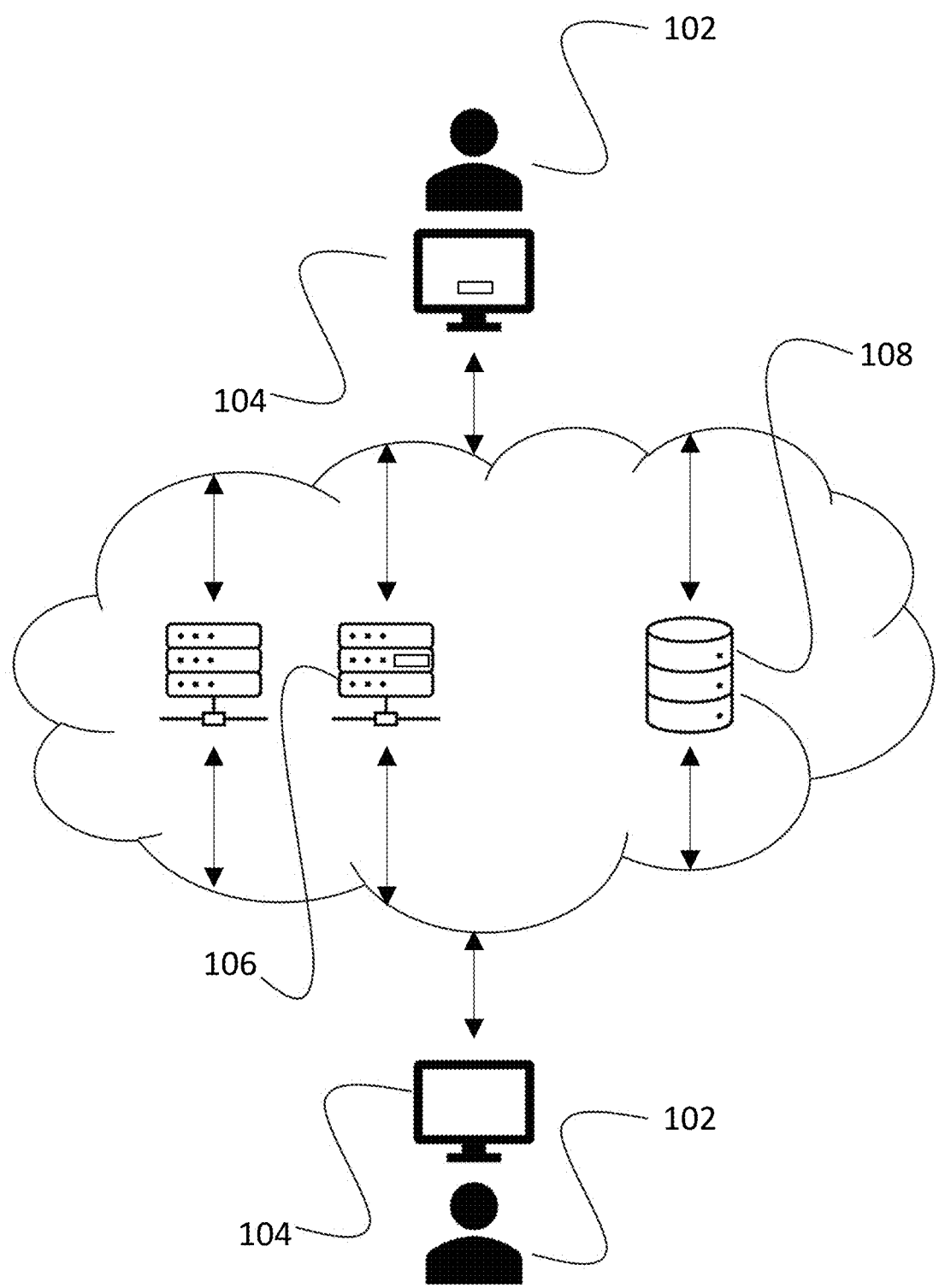
FIG. 1 illustrates a hardware arrangement.

An automated system, which may comprise computer hardware running specifically configured software, ingests large amounts of data obtained or otherwise accessed by an investigator such as a law-enforcement operative seeking to establish facts around a crime or potential crime, such as identifying a victim, potential victim, perpetrator, location, or vehicle associated with the crime.

The automated system analyses the data using a series of tools or processing functions, including a segmentation algorithm, which may leverage a machine learning model, to detect evidential entity appearances in the ingested data. Evidential entity appearances include one or more from among people, locations, organisations, vehicles, objects, and events. A reduction step is performed to reduce the set of evidential entities obtained by the segmenting to a set of semantic concepts, noting that a single semantic concept (i.e. a person) may appear multiple times in the evidence, and so the set of semantic concepts has a smaller membership than the set of evidential entity appearances.

A corresponding reduction step is performed with respect to relationships. A set of appearance relationships is extracted from the ingested data, which is reduced in size by mapping the appearance relationships to the set of semantic concepts. The set of semantic concepts is augmented by the mapped relationships. A number of relationships is reduced in mapping from the appearance relationships to the semantic concept relationships since plural appearance relationships will represent the same relationship between the same two semantic concepts. For example, person X may appear in multiple images with the same other person Y. Each of the multiple images accounts for separate appearance relationships, but they map to the same semantic concepts. The set of semantic concepts is augmented by the relationship information.

The augmented set of semantic concepts provides a searchable manifestation of the ingested data. The searching may be by a machine learning algorithm, and may be based on pattern matching, or may be vector-based. The searching is a mechanism to test hypotheses, wherein hypotheses effectively form the search string or search target, and a level of correspondence with the augmented set of semantic concepts provides an indication of confidence in, or level of evidential support for, an input hypothesis. Hypotheses may be input to the system by a user in natural language, wherein the system is configured to parse the input hypothesis into a format for comparison with the augmented set of semantic concepts. For example, at least one of vectorising the input hypothesis, or encoding the input hypothesis as a data graph excerpt.

The searching or comparison step enables a subset of the digital input data to be selected for output. The comparison or searching aligns or maps the hypothesis to a portion of the augmented set of semantic concepts. For example, all semantic concepts matching a description provided in the hypothesis. Once the portion of the augmented set of semantic concepts is identified, the mapping used to map appearances and appearance relationships is followed in reverse to identify the appearances mapping to the portion. The pieces of input data containing those appearances are output to the end user in response to the hypothesis. Therefore, the end user is provided with a vastly reduced dataset to review, interrogate, or otherwise analyse, in comparison with the initial ingested digital input data.

Furthermore, the system may be configured to extend or otherwise alter the hypothesis based on the augmented set of semantic concepts, and to output to the end user the altered hypothesis and the associated pieces of input data containing appearances of semantic concepts identified in or otherwise related to the altered hypothesis.

The system effectively executes a series of data reduction steps to automate a process of extracting from a larger dataset a smaller subset of data items relevant to a hypothesis, that is, a smaller subset of data items that are notable in the context of the hypothesis. In the first instance, an investigator can restrict attention and analysis resources to the smaller subset.

The system described above, and set out in more detail below, provides investigators a tool, which is underpinned by data analysis technology endowed with sufficient intelligence, capable of performing reliable examination of digital material, and consequently boosts the ability of investigators to rapidly test hypotheses and establish facts. The system automates ingestion and analysis of large collections of input data and returns evidential entities indicative of the most probable propositions about the matter being investigated.

The system is configured to assist investigators of crime cases where the evidence is contained in text, visual, and/or aural data (e.g. in image, video, text, and/or audio files). The need to automate analysis is particularly strong, due to the high labour cost associated with manual processing of the often large volumes of data, and the diverse and intricate details (which may be invisible to, or easily overlooked by, a human, despite its potential evidential value) contained in visual or aural data. Conventional investigation tools do not provide the required support for investigating such evidence efficiently and effectively, because of technological limitations associated with the level of intelligence built into the tools. To be more effective, the system analyses rich information content of evidential data, and autonomously extracts reliable and relevant probative clues, with sufficient accuracy to match the stringent demands of investigations.

A key step executed by the system is the detection of a set of semantic concepts from among the input data as meaningful evidential entities. An entity is a piece of evidence which may correspond to a person, an object, a location, or an event, for example. The system provides a mechanism to extract from the input dataset a subset of evidential information linked to semantic concepts specified in a hypothesis, such as a victim or suspect, with focus on the evidential entities depicted in, heard or mentioned in, or connected in some pertinent manner to, the data under the wide range of unconstrained conditions associated with data seized or recovered by police in investigations. Examples of the wide-ranging evidential information, which is input to the system as digital input data includes digital image, video, audio or text data, which may be annotated with descriptions of events, people, objects or locations depicted in an image or video, or heard in the audio, or written in the text, and their potential link to other evidential entities. Specifically, the information may take the form of: the time or place when or where an event occurred; the type or description of one or more evidential objects (e.g. gun, knife, money, . . . ), and their potential link to other evidential entities; the face, age, clothing, or other identifying characteristics of people; the presence or mention of nudity in an image, video or text; etc. Information in this context is taken to mean information embodied in the digital input data but not necessarily extracted, understood, interpreted, or otherwise made available to an investigator in the absence of manual analysis of the digital input data.

The system may be a computer system, such as illustrated in FIG. 1. The computing system includes a data storage system 108 storing the digital input data, and a number of interconnected server computers 106 for processing the digital input data in accordance with the computer-implemented methods described and defined in the present disclosure. An end user terminal (or terminals) 104 provide investigators 102 an interface to interact with the system, for example to view outputs and to input hypotheses.

The computing system may be configured to support decision-making during investigations, to establish the truth concerning evidential entities.

An entity may be a person, object, location, event, or other piece of evidence, as applicable to the investigation being conducted.

When investigating a crime, or other cases, which may involve entities such that one or more entities may have some associative link with another, an investigator may require computer support to identify and analyse evidential entities needed for resolving the case. As part of the process of resolving the case, the investigator may be required to establish the merit of different propositions or hypotheses tying together evidential entities, to provide answers to one or more investigative questions or to test one or more investigative hypotheses, for example. Often, it is too laborious or even impossible for investigators to reliably extract or identify the entities, or to reliably establish their defining attributes. Having a computer system such as illustrated in FIG. 1 to extract the relevant evidential entities, including their defining attributes (where required), together with one or more indicators of the strength of each piece of evidence, and tie the extracted information to one or more investigative propositions associated with the entities, enables investigators to resolve cases faster and reliably, by utilising the best evidence available under the given circumstances of the case.

Figure 2A:
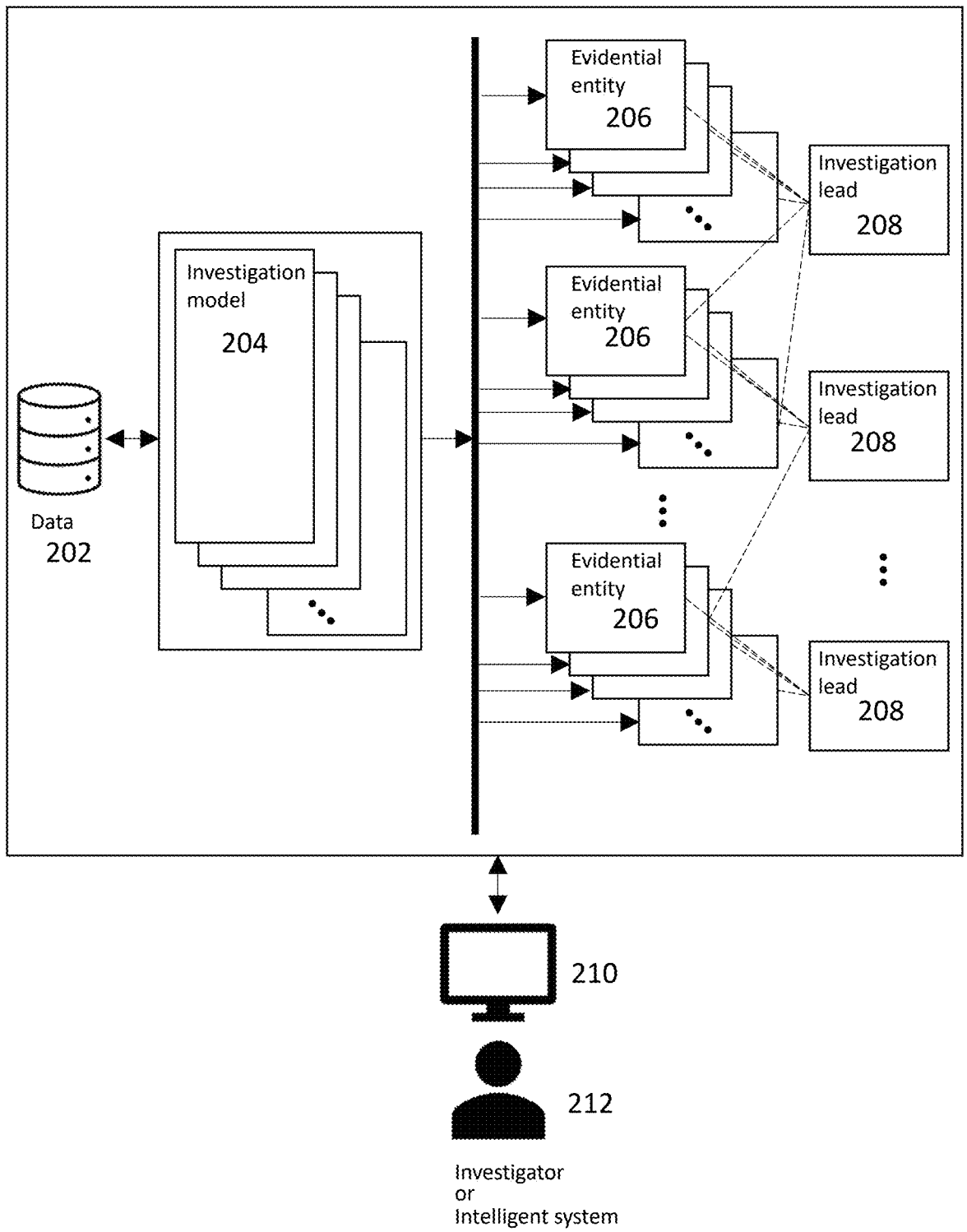
FIG. 2A is a schematic illustration of a data processing function.

FIG. 2A illustrates data artefacts in a computer system such as is illustrated in FIG. 1.

Digital input data 202 is obtained from sources including one or more from online storage locations and physical devices. The physical devices may be hard drives or other digital storage hardware seized as evidence in an investigation into potential criminal activities of an alleged sex offender. The purpose of such an investigation may be to identify and locates victims or potential victims, and to obtain evidence of crimes already committed. The digital input data 202 may be a very large amount of data, including images and videos, that it would not be feasible for an investigator to analyse owing to the sheer volume of data and information. The digital input data, in addition to images and videos, may include text data such as notes made by law enforcement personnel or investigators, statements such as witness statements, transcripts obtained in evidence. Digital input data may also include respective metadata, which may indicate location at which images were taken, times, etc.

Investigation models 204 analyse, or are used in analysing, the digital input data to extract evidential entities. The input to an investigation model is digital input data. The output is identification of evidential entities.

Each investigation model comprises a set of processing instructions for processing the digital input data to extract evidential entities from digital input data. In addition, investigation models may be guided by manual input such as the inclusion of a question for the investigation model to answer. That is, the investigation model may be configured to extract the evidential entities and to apply logic to the extracted evidential entities to address a question input as a runtime variable by the investigator.

FIG. 2A illustrates the presence of multiple models to represent different digital media (i.e. images, videos, audio, text) may be processed by distinct investigation models 204. The investigation models may leverage artificial intelligence technology specialised to narrow knowledge domains. Examples of such narrow knowledge domains include face classification, nudity classification, etc. Consequently, the computer-implemented methods leverage a number of specialised narrow machine-learning based investigation models 204. The investigation models 204 may be deep learning models.

Figure 2B:
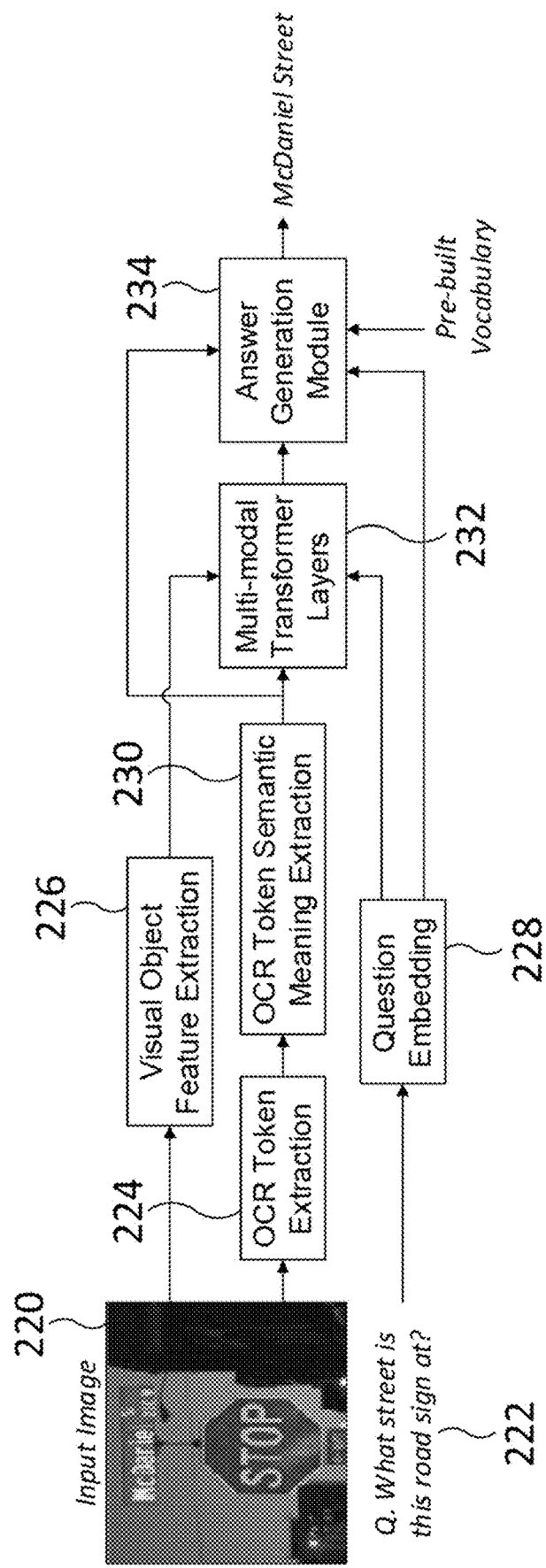
FIG. 2B is a schematic illustration of an investigation model.

An example of such an investigation model 204 is illustrated in FIG. 2B. FIG. 2B illustrates schematically the function of a deep learning investigation model 204 for extracting evidential entities. The deep learning investigation model 204 of FIG. 2B is developed and configured specifically for use in computer-implemented methods disclosed herein.

The deep learning investigation model 204 illustrated in FIG. 2B is configured to extract information from images including written text. Written text (e.g. a road sign, a shop sign, a clock, a poster on a wall, a number plate, a bank card, etc) appearing in an image 220 may provide important information relevant to an investigation, such as: location, time, personal identifying information, etc. The automated investigation system, or the investigator, may use the investigation model 204 of FIG. 2B to search an image, to extract, as text data or as an object, this type of evidential entity. In the example of FIG. 2B, the visual object feature extraction module 226 has detected a stop sign and a street sign in the same input image 220. The model is configured to respond to the detection of objects containing text information to look for possible location information, and therefore the processing executed by the model includes probing the image further, seeking the name of the street. For example, an OCR token extractor 224 is trained to convert image data to alphanumeric characters, punctuation, etc. The OCR token semantic meaning extractor 230 is trained to assign semantic meaning to the tokens.

Depending on instructions provided to the system by a user, the extracted information may be to extract information about all entities, or a search query may be input by the user to limit the extracted information to being consistent with the search query. Examples of search queries include descriptive text (e.g. 'child in a vehicle') or a target image or image excerpt may be the search query. For example, an object such as a person or vehicle appearing in a target image may be segmented by a segmenting algorithm and selected by the user (investigator) as a probe to be the focus of a search in a search space comprising the digital input data.

The components of the investigation model of FIG. 2B include convolutional neural networks (CNNs) such as the visual object feature extractor 226 and the OCR token extractor 224, trained to extract visual objects and their features. Transformer layers 232 are configured to process both visual and textual information to produce the text sequence which will be returned in response to a probe (such as "What street is this road sign at?", in the illustration given above). The question 222 is embedded by a question embedder 228. The question may be provided to the model manually by an investigator via a user interface of the system, or the question may be one of a set of predefined question that the investigation model applies to the image based on the output of the feature extractor 226. For example, if street sign is detected, ask 'what street is this road sign at'. The answer generation module 234 may use a pre-built vocabulary to output answers.

The training data for each investigation model 204 is dependent upon the type(s) of evidential entity/entities that the model is configured to extract. For the investigation model 204 illustrated in FIG. 2B, the training data comprised images depicting real-world entities including many instances of images that include textual information in them; the images were complemented by natural language text probes for querying the content of an image. The ground-truth corresponding to these data was also provided. The loss function used for CNNs and transformers was the cross-entropy loss (softmax loss).

The investigation model 204 may be generic or may be specific to a particular type of investigation, a particular category of crime, or a particular investigator or team of investigators. The investigation model 204 provides weights, biases, processing instructions, classification rules, and other runtime parameters to control processing of the digital input data 202 to extract a plurality of evidential entities 206 which are mapped to semantic concepts so that they can be separated and labelled in a meaningful way, and the pieces of digital input data 202 showing, containing, describing, or otherwise relevant to the evidential entity can be tagged or labelled accordingly.

Processing tasks including one or more from among:
Segmenting the digital input data to obtain a set of segmented entity appearances;
Encoding the population of segmented entity appearances by mapping the population of segmented entity appearances to a set of defined semantic concepts;
extracting from the digital input data a set of appearance relationships between segmented entity appearances;
augmenting the set of defined semantic concepts by encoding, in accordance with the mapping, the population of appearance relationships as semantic relationships between the defined semantic concepts.

The processing tasks include image processing techniques and may also augment the facts (the encoded semantic concepts and semantic relationships) with information from the metadata of the relevant digital input data.

An appearance is an instance of a representation of a real world entity in a data artefact. For example, an individual person appearing in two digital images is two appearances mapping to a single semantic concept, the semantic concept defining the real world entity.

A semantic concept may map to a single real world entity or may map to plural real world entities. For example, a semantic concept may be an individual identified person so that the mapping is from the semantic concept representing the person, to the real world person. And the appearances mapping to the semantic concept is all appearances of that person. On the other hand, an investigation may relate to a description of an individual, such as 'blonde girl aged under 10', in which case the semantic concept is 'blonde girl aged under 10', and there could be plural real world entities represented in the digital input data matching that description. So the semantic concept maps to plural real world entities. And appearances of all of those plural real world entities map to the semantic concept.

The investigation model 204 may comprise or have access to a set of descriptions of evidential entities relevant to an investigation. The investigation model may comprise one or more digital images of evidential entities relevant to an investigation that may be used to train a machine learning algorithm to map appearances to semantic concepts in processing the digital input data 202.

Appearance relationships may include, for example, appearing together in a single digital image or video, appearing in the same vehicle at different times, appearing at the same location at different times. An appearance relationship is a relationship between two, or more, segmented objects. Once the segmented objects have been mapped to semantic concepts, the semantic concepts are used to encode the appearances in the digital input data so that the appearance relationships are between two, or more, semantic concepts. Therefore, the appearance relationships may be encoded as semantic relationships.

As an example, the same pair of people appearing in two different digital images. In the first image, it is segmented object A and segmented object B, and the appearance relationship is segmented object A and segmented object B both being in the first image. In the second image, it is segmented object C and segmented object D, and the appearance relationship is segmented object C and segmented object D both being in the second image. Once segmented objects A and C have been identified as being the same person and mapped to semantic concept NAMED PERSON AC, and segmented objects B and D have been identified as being the same person and mapped to semantic concept NAMED PERSON BD, the semantic relationship is 'AC and BD appearing together in images', and the first and second images are tagged with the semantic relationship, and with the semantic concepts corresponding to the names.

In FIG. 2A, the evidential entities are grouped, the groupings are a reflection of the semantic relationships between entities, and may be devised by a pattern matching algorithm and/or a clustering algorithm. Investigation leads 208 may be semantic relationships identified in the digital input data. The investigation leads 208 may be determined in the light of a hypothesis input to the computer system 210 by an investigator 212 or an intelligent virtual assistant. The hypothesis might be 'child with blond hair was transported in a red car'. In that case, the investigation leads 208 generated by the computer system based on the semantic concepts and semantic relationships may be directly or indirectly related to the hypothesis itself (images comprising both a red car and a child with blond hair). Additionally, the system may be configured to adaptively modify the hypothesis. For example, it may be that there is little evidence showing a child with blond hair in a red car, but there is a lot of evidence tagged with the semantic relationship between a child with blond hair and a blue car. The computer system is configured to attach merit scores to semantic relationships and to evidential entities themselves (for example—higher number of appearances leads to a higher merit score) so that the system in an automated way can determine that there may be significance in the semantic relationship between the child with blond hair and the blue car, which can be output as an investigation lead 208.

A worked example is provided with reference to FIGS. 2C to 2F.

Figure 2C:
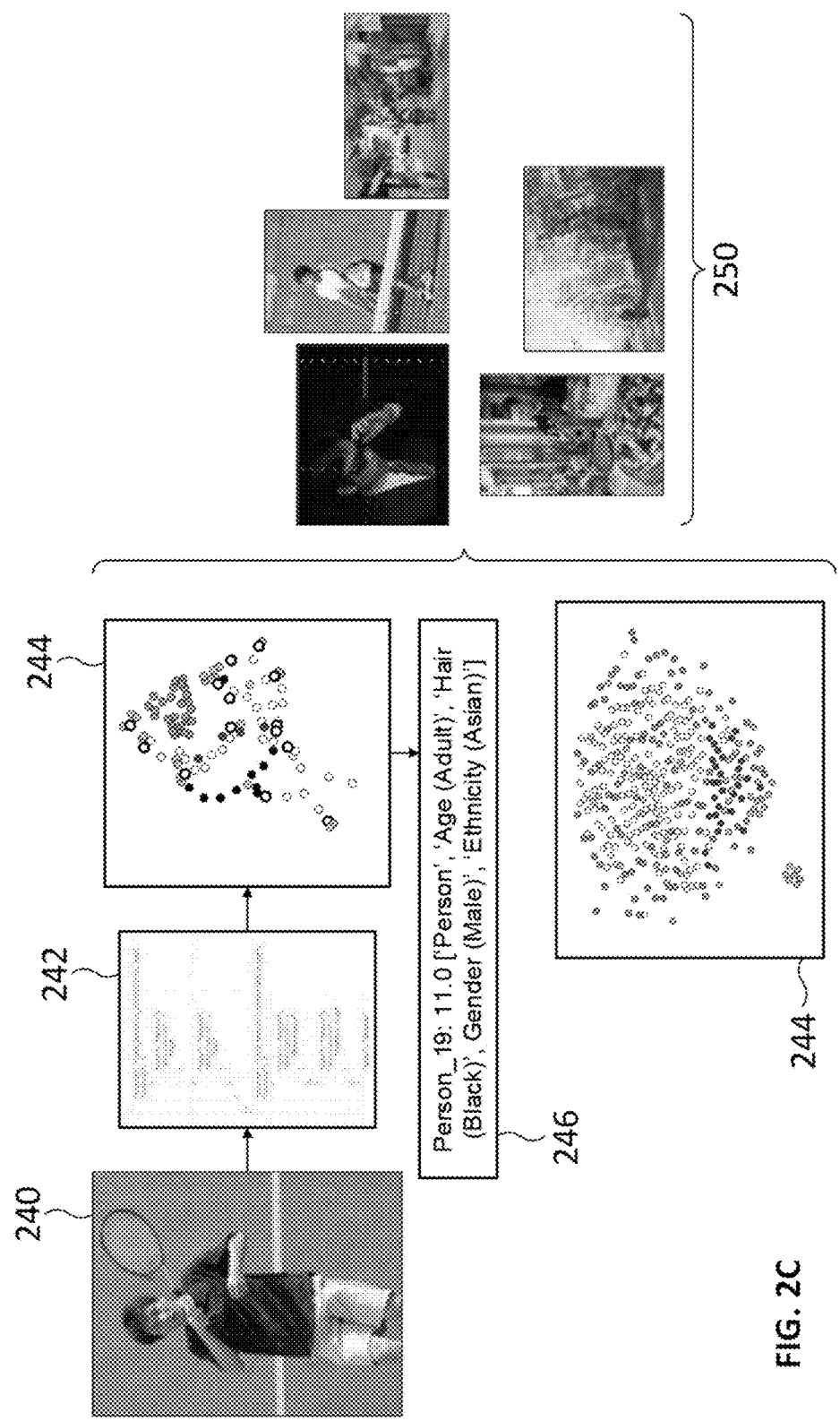
FIG. 2C illustrates the use of a visual probe.

Assuming that, based on some intelligence gathered by an investigator, a person of interest (an adult Asian male, with black hair) is sought, the investigation may begin with the investigator inputting to the system via a user interface a hypothesis that 'suspect is Asian, male, with black hair'. Based on the input hypothesis, the system will trigger analyses of the digital input data including an analysis based on a visual probe 240 (such as illustrated in FIG. 2C), and an analysis based on a text probe (such as "Adult Asian male, with black hair") from the input hypothesis. If an image of the suspect exists and is available to the investigator, the image may also be input to the investigation model to serve as the probe, that is, a basis for comparison in processing the remainder of the digital input data. If no such image exists, or as an additional probe, a text descriptor of the suspect (entity) may be used as a probe. In the worked example, the investigation model (in the form of an image segmentation model, implemented as a CNN) which detects evidential entities in images returns three hits (see FIGS. 2C to 2F), in a first sweep, analysis, or processing of digital input data.

FIG. 2C illustrates schematically the processing of a piece of digital input image data 240 which is used as a visual probe, a search query, in order to extract evidential entity information from the full set of digital input data 250. The probe image 240 is provided to an image segmentation model implemented as a convolutional neural network as part of an investigation model to obtain intermediate forms 242 and 244 in order to extract information about evidential entities 246 from the full set of digital input data 250. The sweep or analysis based on the probe is then carried out for a full set of digital input data 250.

Figure 2D:
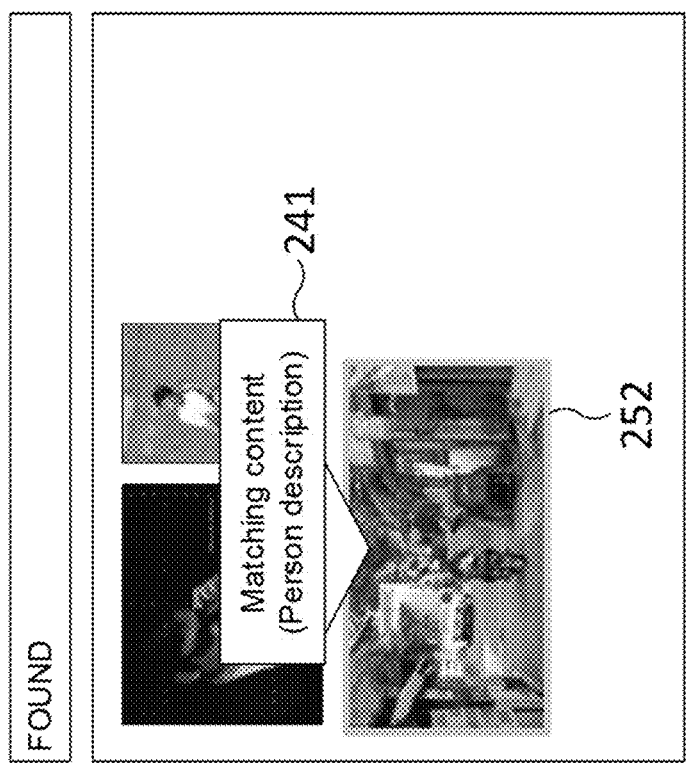
FIG. 2D is a screenshot of a system searching based on a visual probe.
Figure 2D:
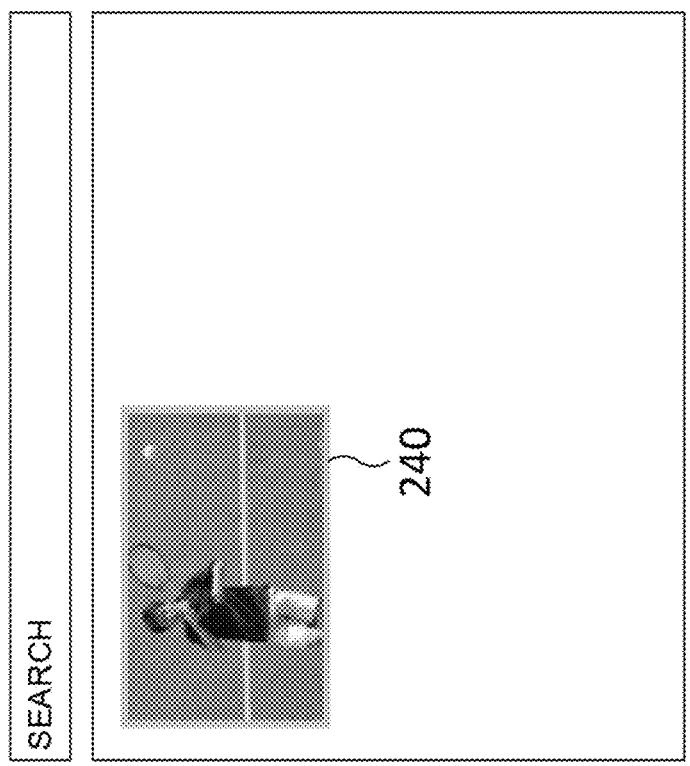

FIG. 2D illustrates a screenshot of a graphical user interface of the system. The investigation model, based on the visual probe 240 and the text probe, returns three hits 252 from the full set of digital input data 250. In the worked example, three hits are found, including a street scene which may contain further evidential entities linked to the hits returned by the first sweep. The results page also displays to a user a label 241 explaining why a piece of digital input data is selected as a result or hit. In the example of FIG. 2D, in the lower image there is a person matching the person description. The yellow car (visible in the third hit image) may be deemed relevant by the investigator (based on intelligence, for example), or the AI may have been set to exhaustively search for evidence (in which case, all visual entities will be segmented, in each of the hit images). Either way, based on the results, a second sweep of the entity discovery process is initiated based on a different probe, namely the yellow car.

Figure 2E:
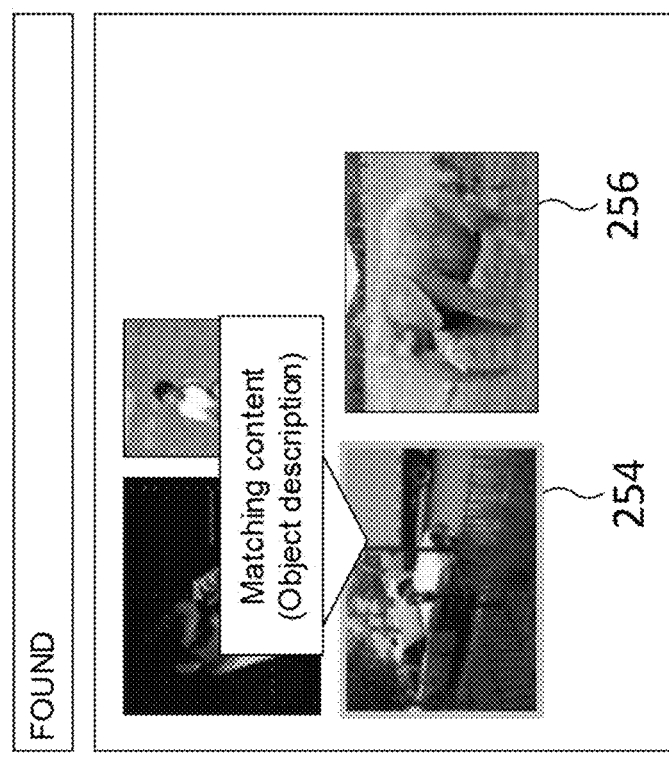
FIG. 2E is a screenshot of the system suggesting a new visual probe.
Figure 2E:
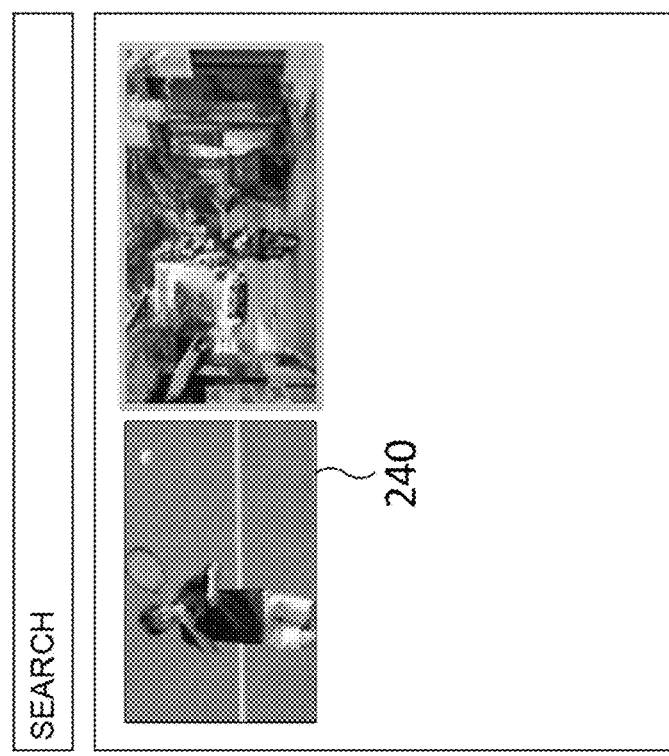

FIG. 2E illustrates a further screenshot of a graphical user interface of the system. FIG. 2E shows results of the second sweep of the entity discovery process based on the yellow car as the probe. The process returns a vehicle of interest, in an image 254 which happens to include some location information in its metadata. Hence, a third sweep of the entity discovery process (deploying a metadata search) is initiated based on the metadata, which will use the location information as a probe into the metadata of images, which will bring up a hit 256, in the form of an image of a nature reserve for elephants (the image on the lower right).

Figure 2F:
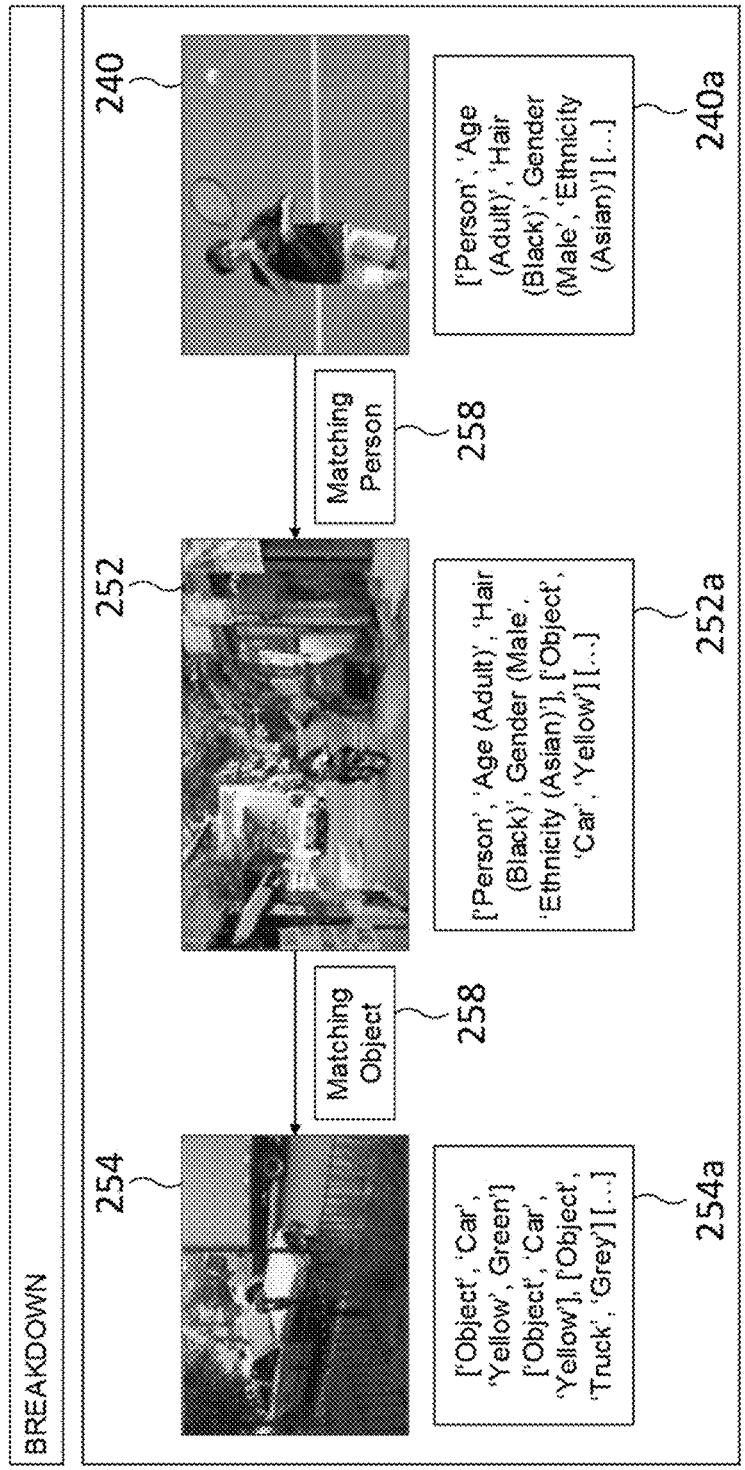
FIG. 2F is a screenshot of the system outputting a results breakdown.

FIG. 2F illustrates a further screenshot of a graphical user interface of the system. FIG. 2F shows a breakdown view allowing a user to interrogate the results further. In the breakdown view, the results images 252 254 are illustrated along with respective entity information 252*a* 254*a* being values of data fields describing entities appearing in the images. Furthermore, the breakdown view includes labels 258 articulating to a user a link between the images and back to the original probe image 240 and evidential entity information 240*a* appearing therein.

Figure 3:
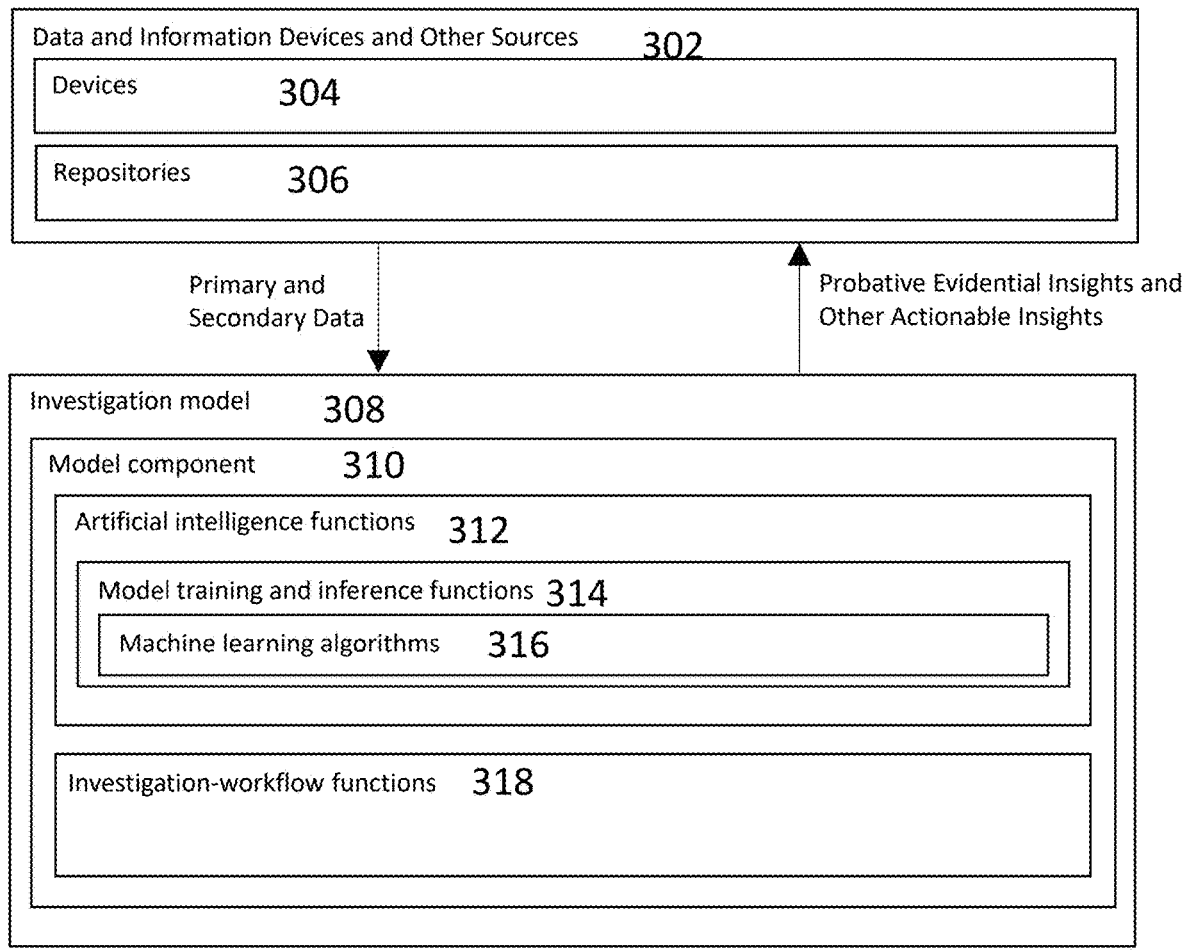
FIG. 3 is a schematic illustration of data artefacts.

FIG. 3 is a schematic illustration of data artefacts in a computer-implemented method, and functional relationships between data artefacts.

Data and information devices and other sources 302 are sources of digital input data, including devices 304 such as hard drives, memory cards, and physical devices having digital storage, and also including repositories 306 such as online accounts.

The digital input data is processed by processor hardware in accordance with processing logic and other processing constraints stored within an investigation model 308. The investigation model 310 comprises a model component 310, which comprises artificial intelligence functions 312 and investigation workflow functions 318. The artificial intelligence functions 312 comprise model training and inference functions 314 and machine learning algorithms 316.

FIG. 3 highlights that the investigation model 308 processes the digital input data 302 and generates probative evidential insights and other actionable insights, which are used to re-interrogate the digital input data.

An example of an investigation model is a deep learning model for extracting evidential entities such as illustrated in FIG. 2B. For example, as part of an investigation into crimes such as human trafficking, the devices 304 may include a laptop computer taken in evidence and the repositories may include a cloud data storage account. The investigation model includes a model component such as an entity extractor deep learning model as per FIG. 2B. In particular, the entity extractor deep learning model comprises artificial intelligence functions trained to process data accessed from the devices 304 and repositories 306 such as image data to generate a representation of entities represented in the image data. The artificial intelligence function may be an object recognition function trained with images from historical investigations and labelled by human experts.

The investigation workflow functions 318 guide the processing of the object recognition algorithm, and allow a user to select an image or image excerpt, in which a particular entity appears, they wish to use as a probe in the remaining data (i.e. to identify other appearances of the same entity). Or, to input a text string describing an entity that they wish to identify in the digital input data.

Figure 4:
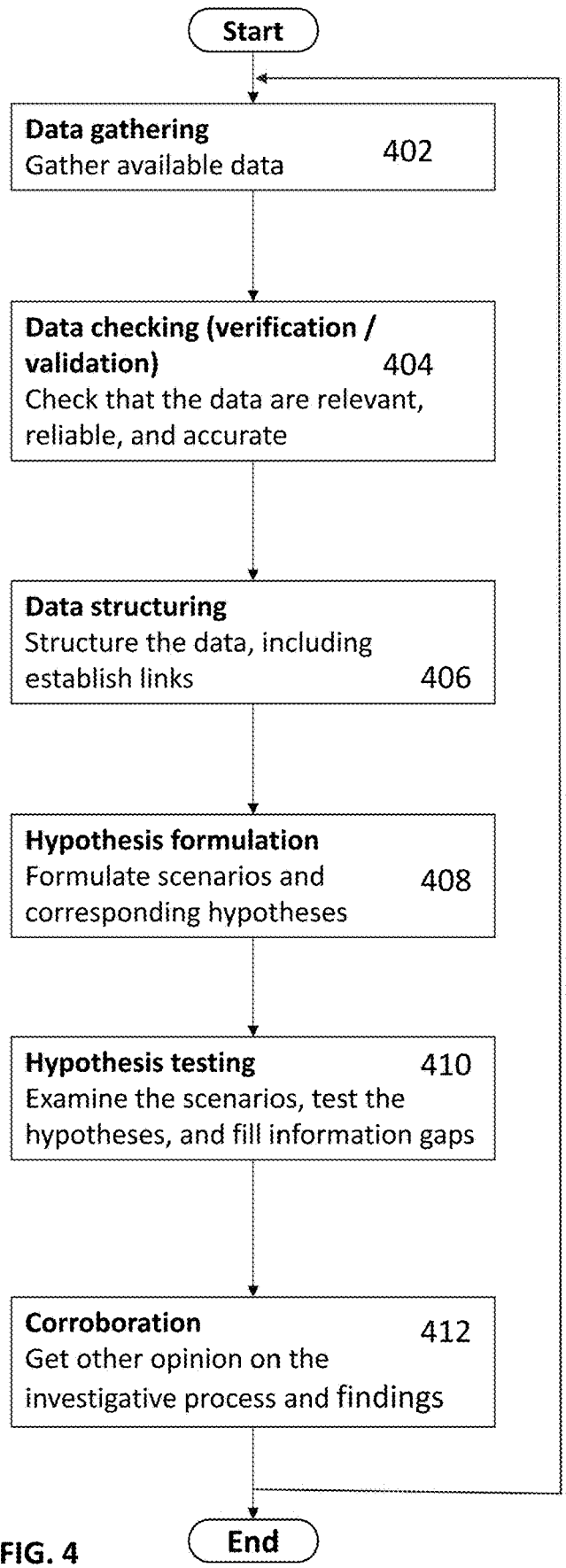
FIG. 4 illustrates a method.

FIG. 4 illustrates a computer-implemented method.

The method begins with data gathering. There may be some manual interaction with a user (investigator) to point the computer system performing the method to the data sources of digital input data that is to be processed. Examples include hard drives seized as evidence from a person being investigated for crimes such as human trafficking and offences relating to sexual abuse. Further examples include data such as images and videos stored in, or accessible via, online accounts to which a person being investigated has provided access to investigators.

At a data checking step 404 the computer system pre-processes the data to check that the digital input data are relevant, reliable, and accurate. For example, an algorithm may be executed which checks relevance by checking the integrity of the data. The data may be checked to ensure its integrity (i.e. that it has not changed); the check takes the form of calculating the hash value (a digital fingerprint, such as an MD5, of the data contained in the file) and comparing it to the hash value written in a case manifest for the investigation maintained by the system (which lists and provides details of each file contained in the case data under investigation), to ensure the data has not changed. Relevance to the case may also be checked at 404, for example by ensuring that the file is listed in the case manifest, or in the intelligence information provided to help investigate the case. Reliability checking is done by establishing whether the evidence source was confirmed to be reliable when case data was compiled.

At the data structuring step 406, the digital input data is segmented, and the segmented objects mapped to semantic concepts which relate to evidential entities. Furthermore, relationships between semantic concepts are extracted. Machine learning algorithms such as object recognition algorithms may be executed on the segmented objects to determine where a single evidential entity appears in plural different pieces of digital input data. An investigation model such as illustrated in FIG. 2B may be utilised at the data structuring 406. An appearance count may be a factor in assigning an evidential merit score to evidential entities. The process of segmenting the digital input data, mapping appearances to semantic concepts, and augmenting the semantic concepts with relationship information, is explained above in relation to FIGS. 2A to 2F in more detail. The semantic concepts and relationship information may be encoded as a knowledge graph in which semantic concepts are represented by nodes, and relationships are represented by edges.

At hypothesis formulation step 408 the semantic concepts and relationship information are used as the basis for a hypothesis formulation process. Hypothesis formulation may be automated, manual, or semi-automated, and may leverage an evidential merit attributed to each semantic concept. The evidential merit may be based upon factors including, for example, the count of semantic relationships attached to an evidential entity. The count of semantic relationships attached to an evidential entity may indicate that it is a key evidential entity, and that it therefore has the potential in the investigation to open many possible evidential trails, or is where evidential trails converge. A further factor in the evidential merit score may be the uncertainty (or confidence) value attached by the model (such as the entity extractor investigation model in FIG. 2F) which detected the entity. Also, the investigator may also tag the entity with a merit value indicating how important they think that entity is, or they may want to indicate the degree of certainty or uncertainty associated with the entity (for example, as determined through intelligence information provided for the case data).

In the automated case, a pre-trained pattern matching algorithm that has been pre-trained on sample datasets being knowledge graphs representing semantic concepts and relationship information in sample digital input datasets, and ground truth being one or more hypotheses that were factually corroborated by the dataset and were of probative value in an investigation. For example, a dataset may be images showing plural different children in the same room. A hypothesis may have been that the room was a location of interest in the investigation. The appearance of the same room (a semantic concept) multiple times and with many different child occupants would be reflected in the knowledge graph by a node representing a location semantic concepts with semantic relationship edges to nodes representing child semantic concepts. By repeating the training with a significant number of datasets and hypotheses, the pattern matching algorithm learns patterns of interest (in the example it might be a node representing a location or object entity appearing with multiple different child entities). The hypothesis or hypotheses are formulated by the investigator(s) based on the intelligence information available, or the evidential entities produced by the investigation system.

Hypothesis testing is done by pooling the evidential merits of entities which support or conflict with the hypothesis. The evidential support (or lack of) for a hypothesis may be assessed by applying relevant score combination operations. The overall score represents the strength of the hypothesis. Also, a machine learning algorithm is trained to pool the merit scores, assembled into a vector, such that each score is a vector component. By aggregating the vectors, the system is able to compute the aggregate degree of support from evidential entities, as a probability that the corresponding hypothesis is correct, given the supporting or discounting/counteracting evidence, each weighted by its evidential merit. For example, a hypothesis might by that entity=ManX was with entity=ChildY on the date and time=Date TimeZ at a location=LocationQ. Supporting evidence might by an image1 featuring an entity that is identified as ChildY to a 90% confidence level with an entity that is ManX to a 70% confidence level, with metadata indicating that the image was taken at DateTimeZ and at LocationQ. Counteracting evidence might be an image2 featuring an entity that is ManX to a 35% confidence level, with metadata indicating that the image was taken at DateTimeZ but at a Location other than LocationQ. Image1 supports the hypothesis, and in a very simple calculation example the degree of support could be calculated as 0.9×0.7=. 63 or 63%. Image2 counteracts the hypothesis and in a very simple calculation example the degree of discounting/counteracting could be calculated as 0.35. Assuming confidence levels pertaining to the metadata is 100%, which may not be the case. In simple terms, degree of support or counteracting a hypothesis may be calculated by an aggregate confidence level in the data item values relevant to the hypothesis.

The hypotheses generated at 408 may be presented to a user (investigator) via a graphical user interface between the computer system and the user. Each hypothesis asserts a fact about a semantic concept. Each semantic concept is mapped in the data structuring 406 from appearances (segmented objects) in pieces of digital input data. Therefore, it can be appreciated that each hypothesis is underpinned by one or more pieces of digital input data, which underpinning is traceable via the data structuring 406. The hypothesis testing 410 therefore may include presenting the hypothesis to the user (investigator) along with the pieces of digital input data (or excerpts from, or links to, the digital input data) underpinning the hypothesis.

An optional corroboration step 412 may include getting an opinion of another investigator on a hypothesis. The computer system may be configured to output a report on a hypothesis from 408 including the hypothesis and the digital input data underpinning the hypothesis. The corroboration 412 may lead to a new data gathering process (i.e. adding new digital input data) triggering an update of steps 402 to 406, and new hypotheses being formulated 408 and tested 410, and consequently a new corroboration step 412. Thus, it can be appreciated that the computer-implemented method of FIG. 4 may be an iterative computer-implemented method.

Figure 5:
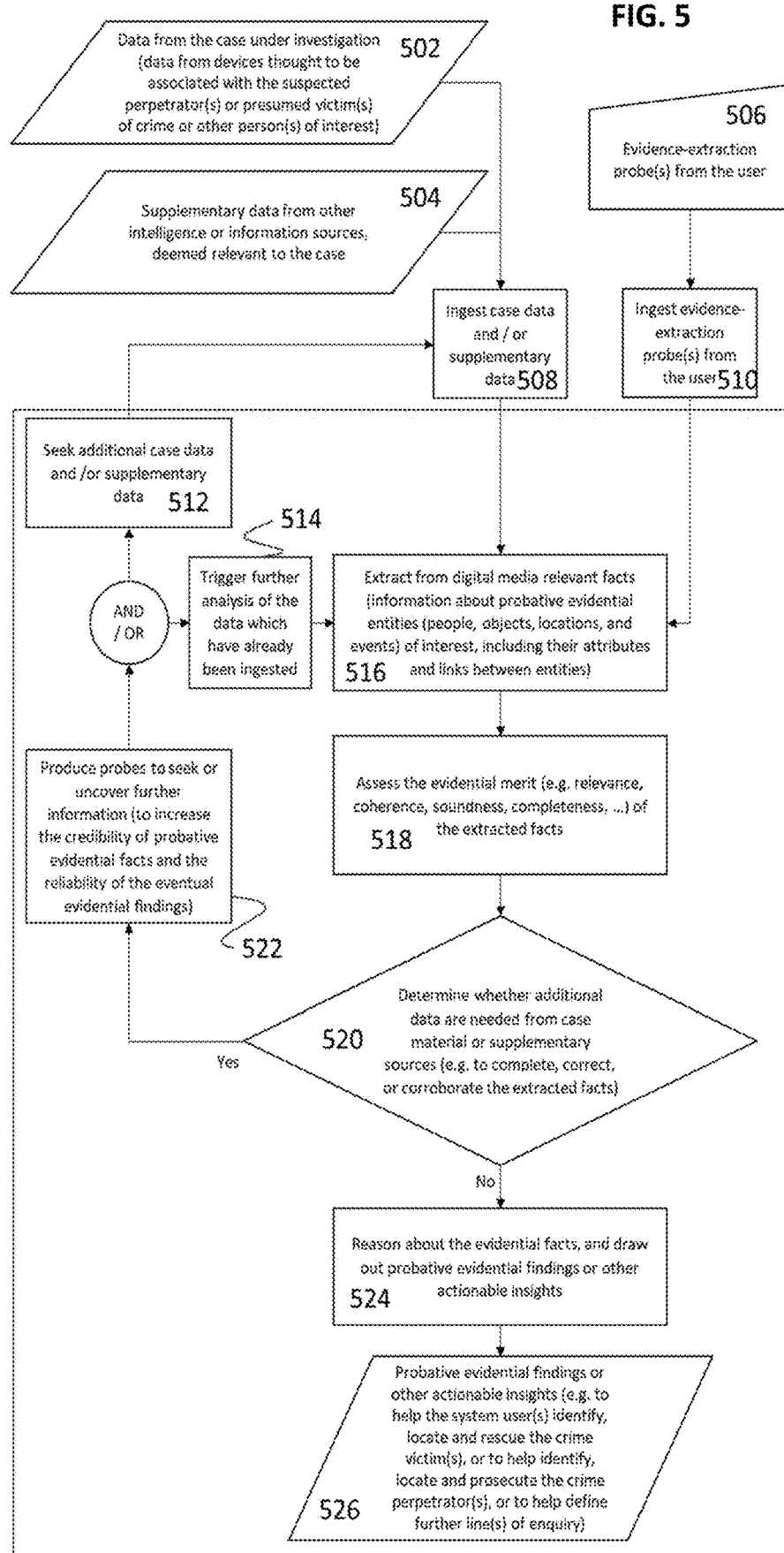
FIG. 5 illustrates a method.

FIG. 5 illustrates a computer-implemented method for processing digital data relating to a criminal investigation. The method is an example of that illustrated in FIG. 4, leveraging the data architecture of FIG. 2, and executable by a computer system of FIG. 1.

In a first step 508, data relevant to the investigation and/or supplementary data are ingested. The data ingestion step 508 is an example of the data gathering 402 of FIG. 4. The data for ingestion may be obtained from multiple sources of digital input data including one or more from among: digital photographic images; digital video; and respective metadata; and optionally also including natural language text data such as transcripts of conversations, witness statements.

In the method of FIG. 5, the digital input data include data 502 from a case under investigation and supplementary data 504. The data 502 may be data from a device or devices having data storage hardware and associated with either: the suspected perpetrator or presumed victim of a crime or another person of interest. The supplementary data 504 are data from other intelligence or information sources that the investigator considers to be relevant to the case.

The data ingestion step 508 may include establishing wired or wireless connections between the storage devices on which the data 502 and supplementary data 504 are stored, and running scripts to copy the data and parse them for downstream processing.

A further source of information is evidence-extraction probe or probes 506 from the user, which probe or probes are ingested at further data ingestion step 510. The further data ingestion step 510 comprises ingesting evidence extraction probes from the user. An evidence extraction probe is a search query for one or more evidential entities. It can be some image(s), an image excerpt, descriptive text (such as "Asian male"), or question(s). Evidence probes are described in more detail above with reference to FIGS. 2B to 2F.

Downstream of the data ingestion step 508 and further data ingestion step 510 is an image processing step 516. Image processing 516 may include executing an image processing procedure on the digital input data including: segmenting the digital input data to obtain a set of segmented entity appearances; encoding the population of segmented entity appearances by mapping the population of segmented entity appearances to a set of defined semantic concepts;
extracting from the digital input data a set of appearance relationships between segmented entity appearances; augmenting the set of defined semantic concepts by encoding, in accordance with the mapping, the set of appearance relationships as semantic relationships between the defined semantic concepts.

In particular, the image processing step 516 includes extracting from digital input data relevant facts. Facts in this context is understood as being information about evidential entities of interest. The information may include, for example, attributes and also relationships between evidential entities. Examples of evidential entities are people, objects, locations, and events. Models such as illustrated in FIG. 3 guide the image processing step 516. The image processing step 516 is exemplary of the data structuring 404 of FIG. 4.

Evidential entities are represented in the data domain by respective semantic concepts. An evidential entity is a real-world entity, and a semantic concept is a semantic descriptor or label thereof in the data domain. The segmenting and encoding steps are exemplary of object recognition.

The image processing procedure executed on the digital input data may include receiving from the end user a hypothesis including a search query comprising an image of an entity or entities or a text string describing an entity or entities. The segmenting the digital input data to obtain a set of segmented entity appearances may be limited to entity appearances of entities matching the search query or satisfying the search query to within a predefined similarity threshold.

Downstream of the image processing step 516 is an additional processing step 518 comprising assessing the evidential merit of the digital input data and of the semantic concepts and relationships determined at step 516. The scores may be assigned by a machine learning model trained to assign scores to digital input data and to semantic concepts and relationships. The additional processing step comprises assessing the evidential merit of the extracted facts, which are, for example, semantic concepts and semantic relationships. Evidential merit may include scores for each of one or more factors from among: relevance, coherence, soundness, completeness. The factor scores may be combined in a summation, average, or weighted average, to obtain a single quantitative value representing evidential merit of a particular item of digital input data or semantic concept.

Optionally, wherein the augmented set of defined semantic concepts is encoded in a data graph (which may be referred to as a knowledge graph), in which data graph each of the set of defined semantic concepts is represented by a node, and each of the semantic relationships is represented by an edge between two nodes.

Step 518, or step 508, may include image processing such as assigning a digital input data score to each piece of identified digital input data representing a value of the piece of identified digital input data in supporting the parsed hypothesis. The scores assigned to the pieces of identified digital input data are calculated based on one or more from among: a score calculated by a pre-trained machine learning algorithm; and a set of predefined processing rules.

As an example of predefined processing rules, an image processing algorithm may be executed to determine one or more image quality characteristics, and to assign a score to digital images or digital video based on the image quality characteristics. Examples of image quality characteristics that could be used include sharpness, noise, distortion.

In a further example, the set of predefined processing rules includes calculating a contribution to the score proportional to a count of a number of segmented entity appearances mapping to the same single semantic concept.

At additional processing step 518, evidential merit of facts is assessed. Step 518 may include at least one of:
assigning a semantic concept score to each defined semantic concept representing a confidence level attaching to the semantic concept based on the appearances of the semantic concept in the digital input data;
assigning a semantic relationship score to each semantic relationship in the augmented set of defined semantic concepts, the semantic relationship score representing a confidence level attaching to the semantic relationship based on the appearance relationships of the digital input data mapping to the appearance relationship.

The semantic relationship score may be a count of the number of relationships the entity has with other entities. The evidential merit score may be, or may be based on, a sum of the count of appearances of the entity in the digital input data and the number of relationships the entity has with other entities. By being based on the said summation, the scores may be normalised across the population (the full set) of entities appearing in the digital input data.

Training data comprising individual pieces of digital input data, or semantic concepts and relationships and underlying supporting digital input data, along with ground truth in the form of human expert assigned scores, may be utilised in training a machine learning model to assign evidential merit scores to the data and semantic concepts. Alternatively or additionally, a set of predefined processing rules may be executable to generate or calculate an evidential merit score. In a simple example, a count of a number of appearances of a semantic concept in the digital input data may be the basis of an evidential merit score. The evidential merit score may be a single value or may be an n-dimensional vector.

At processing step 520 the evidential merit scores are compared with a predefined threshold or thresholds to determine whether additional pieces of digital input data are needed from 502-506 or supplementary sources. The reason for the additional pieces of digital input data would be to provide further support for an evidential fact, and the effect would be to increase the evidential merit score assigned thereto at 518. Wherein further support is completion, correction, or corroboration, of an extracted fact.

If it is determined at processing step 520 that additional data are needed, processing step 522 is executed. Processing step 522 includes producing, instructing, or suggesting, probes to seek or uncover further information. The purpose is to increase the credibility of probative evidential facts and the reliability of the eventual evidential findings. A probe may be, for example, a set of instructions or parameters that may be used at image processing step 514 to trigger further analysis of the already-ingested data at 508. For example, such a probe may be used to constrain the processing of a segmentation or object recognition algorithm not to filter out any objects that may fit a description specified in the probe (e.g. 'young girl with brown hair'), noting that any segmentation or object recognition algorithm will implicitly involve some filtering to determine what parts of an image to recognise as an object. Once complete, image processing step 516 is repeated.

A probe may be, for example, a search query and/or a set of instructions or parameters that may be used at step 512 to trigger obtaining further digital input data. Step 512 may include ingesting data already present on devices 502 or as supplementary data 504 but not ingested at 508 the first time, for example because on an initial pass an investigator may have focussed on a subset of digital input data with a view to broadening the inquiry later. Noting that ingestion step 508 is conducted in accordance with instructions input to the computer system by the investigator, which instructions may be to define a subset of available digital input data to ingest. Step 512 may additionally or alternatively comprise outputting an alert or message to an investigator notifying of the evidential fact that is assigned the score not meeting the threshold at 520 and instructing or suggesting that new evidence (digital input data) be obtained. Analysis of the already-ingested data may be performed at 508. For example, a probe (that is, a search query) may be used to constrain the processing of a segmentation or object recognition algorithm not to filter out any objects that may fit description specified in the probe (e.g. 'young girl with brown hair'), noting that any segmentation or object recognition algorithm will implicitly involve some filtering to determine what parts of an image to recognise as an object. Once step 512 is complete, and optionally once a user has provided the further digital input data, the data ingestion step 508 is repeated.

At step 524, the method includes reasoning about the evidential facts, and drawing out probative evidential findings, or one or more actionable insights for the investigator. A hypothesis may be received from the end user including a statement relating to the entity or entities appearing in the search query, the comparing the hypothesis with the augmented set of defined semantic concepts being based on the statement. An example of the output at step 524 is hypothesis, which are assertions of fact concerning the semantic concepts extracted at 516. The method may include transforming a hypothesis input by a user (investigator) into one or more adapted hypotheses which broaden, extend, corroborate, or correct, the input hypothesis. The adapted hypotheses may be output via a user interface along with an indication of evidential support in terms of underlying digital input data, and optionally also a hypothesis score representing the evidential merit scores assigned to the semantic concepts and/or digital input data relating to the hypothesis.

Step 524 may include receiving, from an end user, a hypothesis relating to the defined semantic concepts and expressed in natural language; parsing the hypothesis and comparing the parsed hypothesis with the augmented set of defined semantic concepts to identify, in accordance with the mapping, digital input data featuring at least one of segmented entity appearances and appearance relationships mapping to semantic concepts supporting or otherwise factually consistent with the parsed hypothesis.

Referring back to step 522 and the suggested modified hypothesis, the comparing the hypothesis with the augmented set of defined semantic concepts may include identifying a first semantic concept, being a semantic concept not being represented in the hypothesis received from the end user and having at least one appearance relationship with a second semantic concept, being a semantic concept represented in the hypothesis received from the end user, and outputting to the end user a proposed hypothesis including a representation of the first semantic concept as a search query. And, in response to a positive response from the end user, performing the image processing procedure with the proposed hypothesis replacing the hypothesis received from the end user.

Optionally, the comparing is performed by a pre-trained machine learning model.

Step 524 may include, by the pre-trained machine learning model, or by predetermined processing logic, or by combining both approaches, calculating a hypothesis score representing an extent to which the parsed hypothesis is supported by the digital input data. The hypothesis score may be based on one or more from among:

digital input data scores assigned to each piece of identified digital input data relevant to the hypothesis;

the semantic concept scores assigned to semantic concepts in the hypothesis;

the semantic relationship scores assigned to semantic relationships in the hypothesis.

The hypothesis score may be calculated by the pre-trained machine learning model taking as inputs one or more from among:

digital input data scores assigned to each piece of identified digital input data relevant to the hypothesis;

the semantic concept scores assigned to semantic concepts in the hypothesis;

the semantic relationship scores assigned to semantic relationships in the hypothesis.

The pre-training of the machine learning model may include training the machine learning model with training data comprising hypotheses, and for each hypothesis corresponding support data including at least one of:

digital input data and assigned scores, semantic concepts and assigned scores, and semantic relationships and assigned scores, and as ground truths, hypothesis scores assigned to each of the hypotheses by human experts based on an extent to which the hypothesis is considered to be factually supported by the corresponding support data, the machine learning model being trained to minimise a difference between hypothesis scores generated by the model and the ground truths.

The adapted hypotheses may be generated by a generative function of a machine learning model such as an LLM. The adapted hypotheses may be generated by the pre-trained machine learning algorithm, adaptively modifying the parsed hypothesis to optimise the hypothesis score.

Step 524 may include, by a pre-trained machine learning algorithm, automatically generating a hypothesis based on the augmented set of defined semantic concepts and asserting a fact about one or more of the defined semantic concepts, representing the generated hypothesis in natural language, and outputting the natural language representation of the generated hypothesis.

Step 526 represents outputting the identified digital input data to the end user in response to the received hypothesis. Step 526 may include outputting (to a user interface of the computer system) of the adapted hypotheses or a result of analysing or assessing another input hypothesis. Step 526 may include outputting probative evidential findings or other actionable insights. For example, to help the user to identify, locate and rescue the crime victim or victims, or to help to identify, locate, and prosecute the crime perpetrator or perpetrators, or to help to define further lines of enquiry.

Examples of output at 526 include a generated hypothesis is that a person is a victim or potential victim of a crime. The person being represented in the digital input data by a semantic concept extracted at 516.

Optionally, the generated hypothesis further comprises a predicted geographical location of the victim or of the crime, based on information extracted from the augmented set of defined semantic concepts.

The outputting to the user interface (or in a digital message such as an email to the user) may include outputting the natural language representation of the generated hypothesis including outputting, or outputting links to, the digital input data featuring segmented entity appearances mapped to the one or more defined semantic concepts featured in the generated hypothesis.

Figure 6:
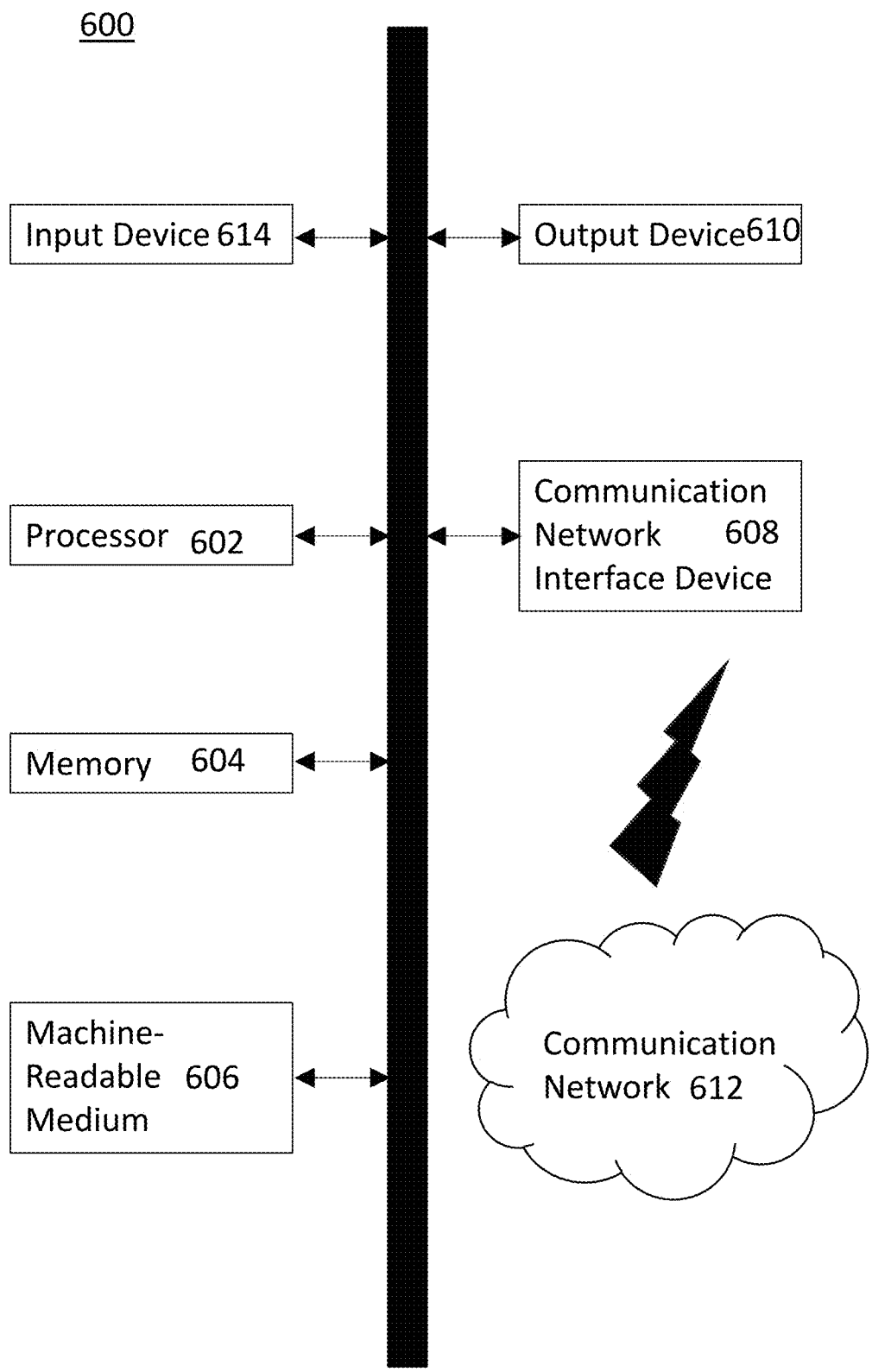
FIG. 6 illustrates a hardware arrangement.

With reference to FIG. 6, a processing system 600 suitable for carrying out the methods described herein will now be described. FIG. 6 shows a block diagram of one implementation of a processing system 600 in the form of a computing device within which a set of instructions for causing the computing device to perform any one or more of the methods described herein may be executed. In some implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term 'computing device' shall also be taken to include any collection of machines (e.g., computers) that individually or jointly execute a set (or multiple sets) of instructions to perform any one or more of the methods described herein.

The example processing system 600 includes a processor 602, a memory 604 (e.g., read-only memory (ROM), flash memory, dynamic random-access memory (DRAM) such as synchronous DRAM (SDRAM) or Rambus DRAM (RDRAM), etc.), which memory may include a static memory (e.g., flash memory, static random-access memory (SRAM), etc.), and/or a secondary memory (e.g., a data storage device), which memory components may communicate with each other via a bus.

Processor 602 represents one or more general-purpose processors such as a microprocessor, central processing unit, or the like. Processor 602 may be one or more special-purpose processors such as an application specific integrated circuit (ASIC), a field programmable gate array (FPGA), a digital signal processor (DSP), network processor, or the like. Processor 602 is configured to execute processing logic for performing the operations and steps described herein. The processing logic may be stored on a machine-readable medium 606. The machine-readable medium 606 may be a non-transitory machine-readable medium.

The processing system 600 may further include a network interface device 608 for communicating over a communication network 612 such as the internet. The processing system 600 also may include an output device 610 being any of a video display unit (e.g., a liquid crystal display (LCD), a cathode ray tube (CRT)), or an audio device (e.g., a speaker). The processing system 600 also may include an input device 614 or devices being one or more from among an alphanumeric input device (e.g., a keyboard or touchscreen), a cursor control device (e.g., a mouse or touchscreen).

In its simplest form, processing system 600 comprises processor 602 and main memory 604.

A data storage device may include one or more machine-readable storage media (or more specifically one or more non-transitory computer-readable storage media) 606 on which is stored one or more sets of instructions embodying any one or more of the methods or functions described herein. The instructions may also reside, completely or at least partially, within the memory 604 and/or within the processor 602 during execution thereof by the processing system 600, the main memory 604 and the processor 602 also constituting computer-readable storage media.

The various methods described herein may be implemented by a computer program. The computer program may include computer code arranged to instruct a computer to perform the functions of one or more of the various methods described herein. The computer program and/or the code for performing such methods may be provided to an apparatus, such as a computer, on one or more computer-readable media or, more generally, a computer program product. The computer-readable media may be transitory or non-transitory. The one or more computer-readable media could be, for example, an electronic, magnetic, optical, electromagnetic, infrared, or semiconductor system, or a propagation medium for data transmission, for example for downloading the code over the Internet. Alternatively, the one or more computer-readable media could take the form of one or more physical computer-readable media such as semiconductor or solid-state memory, magnetic tape, a removable computer diskette, a random-access memory (RAM), a read-only memory (ROM), a rigid magnetic disc, or an optical disk, such as a CD-ROM, CD-R/W or DVD.

The computer program is executable by the processor 602 to perform functions of the systems and methods described herein.

In an implementation, the modules, components, and other features described herein can be implemented as discrete components or integrated in the functionality of hardware components such as ASICS, FPGAs, DSPs, or similar devices.

A 'hardware component' is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase 'hardware component' should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

The invention claimed is:

1. A computer-implemented method for processing digital data relating to a criminal investigation, the method comprising:
    obtaining, by the device, multiple sources of digital input data including one or more from among:
        digital photographic images;
        digital video;
    executing, by the device, an image processing procedure on the digital input data including:
        segmenting the digital input data to obtain a set of segmented entity appearances;
        encoding the population of segmented entity appearances by mapping the population of segmented entity appearances to a set of defined semantic concepts;
    extracting, by the device, from the digital input data a set of appearance relationships between segmented entity appearances;
    augmenting, by the device, the set of defined semantic concepts by encoding, in accordance with the mapping, the set of appearance relationships as semantic relationships between the defined semantic concepts based on an hypothesis received from an end user and relating to the defined semantic concepts and including at least one of natural language and an image of an entity;
    comparing, by the device, the hypothesis with the augmented set of defined semantic concepts to identify, in accordance with the mapping, digital input data featuring at least one of segmented entity appearances and appearance relationships mapping to semantic concepts supporting or otherwise consistent with the hypothesis;
    outputting, by the device, the identified digital input data to the end user in response to the received hypothesis.

2. The computer-implemented method according to claim 1, the method further comprising:
    assigning a digital input data score to each piece of identified digital input data representing a value of the piece of identified digital input data in supporting the hypothesis.

3. The computer-implemented method according to claim 2, wherein
    the scores assigned to the pieces of identified digital input data are calculated based on one or more from among:
        a score calculated by a pre-trained machine learning algorithm; and
        a set of predefined processing rules.

4. The computer-implemented method according to claim 3, wherein
    the set of predefined processing rules includes calculating a contribution to the score proportional to a count of a number of segmented entity appearances mapping to the same single semantic concept.

5. The computer-implemented method according to claim 2, the method further comprising:
    based on one or more from among:
        digital input data scores assigned to each piece of identified digital input data relevant to the hypothesis;
        the semantic concept scores assigned to semantic concepts in the hypothesis;
        the semantic relationship scores assigned to semantic relationships in the hypothesis;
    calculating a hypothesis score representing an extent to which the parsed hypothesis is supported by the digital input data.

6. The computer-implemented method according to claim 5, wherein the hypothesis score is calculated by a machine learning model taking as inputs one or more from among:
    digital input data scores assigned to each piece of identified digital input data relevant to the hypothesis;
    the semantic concept scores assigned to semantic concepts in the hypothesis;
    the semantic relationship scores assigned to semantic relationships in the hypothesis.

7. The computer-implemented method according to claim 6, wherein the machine learning model being pre-trained with training data comprising hypotheses, and for each hypothesis corresponding support data including at least one of:
    digital input data and assigned scores,
    semantic concepts and assigned scores, and
    semantic relationships and assigned scores,
    and as ground truths, hypothesis scores assigned to each of the hypotheses by human experts based on an extent to which the hypothesis is considered to be factually supported by the corresponding support data, the machine learning model being trained to minimise a difference between hypothesis scores generated by the model and the ground truths.

8. The computer-implemented method according to claim 2, the method further comprising:
by a pre-trained machine learning algorithm, adaptively modifying the parsed hypothesis to optimise the hypothesis score.

9. The computer-implemented method according to claim 1, the method further comprising:
assigning a semantic concept score to each defined semantic concept representing a confidence level attaching to the semantic concept based on the appearances of the semantic concept in the digital input data.

10. The computer-implemented method according to claim 1, the method further comprising:
assigning a semantic relationship score to each semantic relationship in the augmented set of defined semantic concepts, the semantic relationship score representing a confidence level attaching to the semantic relationship based on the appearance relationships of the digital input data mapping to the appearance relationship.

11. The computer-implemented method according to claim 1, the method further comprising:
by a pre-trained machine learning algorithm, automatically generating a hypothesis based on the augmented set of defined semantic concepts and asserting a fact about one or more of the defined semantic concepts, representing the generated hypothesis in natural language, and outputting the natural language representation of the generated hypothesis.

12. The computer-implemented method according to claim 11, wherein
the generated hypothesis is that a person is a victim or potential victim of a crime; or
the generated hypothesis is that a person is a perpetrator or a potential perpetrator of a crime.

13. The computer-implemented method according to claim 12, wherein the generated hypothesis further comprises a predicted geographical location of the victim or suspect or of the crime, based on information extracted from the augmented set of defined semantic concepts.

14. The computer-implemented method according to claim 11, wherein the outputting the natural language representation of the generated hypothesis includes outputting, or outputting links to, the digital input data featuring segmented entity appearances mapped to the one or more defined semantic concepts featured in the generated hypothesis.

15. The computer-implemented method according to claim 1, wherein the augmented set of defined semantic concepts is encoded in a data graph, in which data graph each of the set of defined semantic concepts is represented by a node, and each of the semantic relationships is represented by an edge between two nodes.

16. The computer-implemented method according to claim 1, wherein the image processing procedure executed on the digital input data further comprises:
receiving from the end user a hypothesis including a search query comprising an image of an entity or entities or a text string describing an entity or entities; and
the segmenting the digital input data to obtain a set of segmented entity appearances is limited to entity appearances of entities matching the search query or satisfying the search query to within a predefined similarity threshold.

17. The computer-implemented method according to claim 16, wherein the hypothesis received from the end user further comprises a statement relating to the entity or entities appearing in the search query, the comparing the hypothesis with the augmented set of defined semantic concepts being based on the statement.

18. The computer-implemented method according to claim 17, wherein the comparing the hypothesis with the augmented set of defined semantic concepts includes identifying a first semantic concept, being a semantic concept not being represented in the hypothesis received from the end user and having at least one appearance relationship with a second semantic concept, being a semantic concept represented in the hypothesis received from the end user, and outputting to the end user a proposed hypothesis including a representation of the first semantic concept as a search query.

19. The computer-implemented method according to claim 1, further comprising outputting, to a video display unit, the identified digital input data to the end user in response to the received hypothesis.

20. A data processing system comprising processor hardware and memory hardware, the data processing system being configured to perform a computer-implemented method comprising:
obtaining, by the device, multiple sources of digital input data including one or more from among:
digital photographic images;
digital video;
executing, by the device, an image processing procedure on the digital input data including:
segmenting the digital input data to obtain a set of segmented entity appearances;
encoding the population of segmented entity appearances by mapping the population of segmented entity appearances to a set of defined semantic concepts;
extracting, by the device, from the digital input data a set of appearance relationships between segmented entity appearances;
augmenting, by the device, the set of defined semantic concepts by encoding, in accordance with the mapping, the set of appearance relationships as semantic relationships between the defined semantic concepts based on an hypothesis received from an end user and relating to the defined semantic concepts and including at least one of natural language and an image of an entity;
comparing, by the device, the hypothesis with the augmented set of defined semantic concepts to identify, in accordance with the mapping, digital input data featuring at least one of segmented entity appearances and appearance relationships mapping to semantic concepts supporting or otherwise consistent with the hypothesis;
outputting, by the device, the identified digital input data to the end user in response to the received hypothesis.

21. A non-transitory computer-readable medium storing a computer program comprising processing instructions which, when executed by a data processing system comprising memory hardware and processor hardware, cause the data processing system to perform a method comprising:
obtaining, by the device, multiple sources of digital input data including one or more from among:
digital photographic images;
digital video;

executing, by the device, an image processing procedure on the digital input data including:
  segmenting, by the device, the digital input data to obtain a set of segmented entity appearances;
  encoding, by the device, the population of segmented entity appearances by mapping the population of segmented entity appearances to a set of defined semantic concepts;
  extracting, by the device, from the digital input data a set of appearance relationships between segmented entity appearances;
  augmenting, by the device, the set of defined semantic concepts by encoding, in accordance with the mapping, the set of appearance relationships as semantic relationships between the defined semantic concepts based on an hypothesis received from an end user and relating to the defined semantic concepts and including at least one of natural language and an image of an entity;
  comparing, by the device, the hypothesis with the augmented set of defined semantic concepts to identify, in accordance with the mapping, digital input data featuring at least one of segmented entity appearances and appearance relationships mapping to semantic concepts supporting or otherwise consistent with the hypothesis; and
  outputting, by the device, the identified digital input data to the end user in response to the received hypothesis.

* * * * *